United States Patent
Leidig et al.

(10) Patent No.: US 9,867,236 B2
(45) Date of Patent: Jan. 9, 2018

(54) COOKING HOB

(75) Inventors: Karl Leidig, Insingen (DE); Kersten Kaiser, Rothenburg o. d. Tauber (DE); Thomas Fich Pedersen, Rothenburg o. d. Tauber (DE); Florian Ruther, Steinsfeld (DE); Filippo Tisselli, Forlimpopoli (IT); Francesco Corleoni, Meldola (IT); Evi Hessenauer, Buch am Wald (DE)

(73) Assignee: Electrolux Home Products Corporation N.V., Brussels (BE)

( * ) Notice: Subject to any disclaimer, the term of this patent is extended or adjusted under 35 U.S.C. 154(b) by 1370 days.

(21) Appl. No.: 13/577,507

(22) PCT Filed: Mar. 11, 2011

(86) PCT No.: PCT/EP2011/001200
§ 371 (c)(1),
(2), (4) Date: Feb. 13, 2013

(87) PCT Pub. No.: WO2011/113551
PCT Pub. Date: Sep. 22, 2011

(65) Prior Publication Data
US 2013/0186886 A1 Jul. 25, 2013

(30) Foreign Application Priority Data

Mar. 13, 2010 (EP) ..................................... 10002668
Jul. 30, 2010 (EP) ..................................... 10007952

(51) Int. Cl.
*H05B 6/12* (2006.01)
*F24C 15/10* (2006.01)
(Continued)

(52) U.S. Cl.
CPC ........... *H05B 6/1209* (2013.01); *F24C 15/10* (2013.01); *F24C 15/103* (2013.01); *H05B 6/04* (2013.01); *H02J 7/02* (2013.01)

(58) Field of Classification Search
CPC ........... F24C 15/10; F24C 15/103; H02J 7/02; H05B 6/04; H05B 6/1209
(Continued)

(56) References Cited

U.S. PATENT DOCUMENTS 3,761,668 A 9/1973 Harnden et al.
4,348,571 A * 9/1982 Dills .................... H05B 6/1254
219/622

(Continued)

FOREIGN PATENT DOCUMENTS

CN 201069197 Y * 6/2008
EP 0394148 10/1990
(Continued)

OTHER PUBLICATIONS

CN201069197Y_English.pdf; CN201069197Y.pdf.*
International Search Report for PCT/EP2011/001200, dated Sep. 9, 2011, 3 pages.

*Primary Examiner* — Dana Ross
*Assistant Examiner* — Ket D Dang
(74) *Attorney, Agent, or Firm* — Pearne & Gordon LLP

(57) ABSTRACT

The present invention relates to a cooking hob with a mobile upper part and a stationary or mobile lower part. The upper part includes at least one panel (10) arranged at its top side. The upper part includes at least one induction coil (12) arranged below the panel (10). The upper part includes at least one rechargeable battery (14). The upper part includes at least one inverter circuit for generating the alternating current for the induction coil (12). The lower part includes a base plate (18). The lower part includes a power supply circuit (16) arranged on the base plate (18) and connected or
(Continued)

Figure 4:
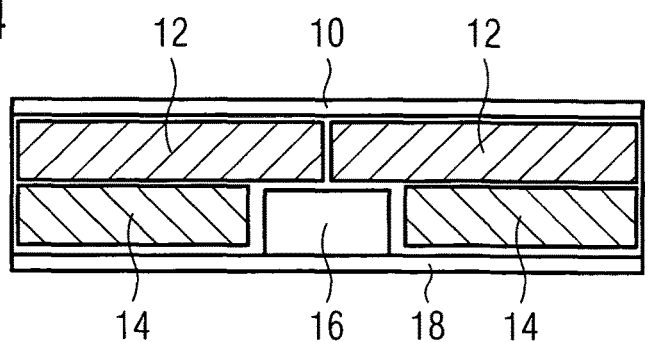

connectable to the grid. The upper part is attachable on and removable from the lower part by a user.

19 Claims, 2 Drawing Sheets

(51) Int. Cl.
*H05B 6/04* (2006.01)
*H02J 7/02* (2016.01)

(58) Field of Classification Search
USPC .......... 219/600, 622, 453.11, 660, 624, 620, 219/601, 621, 627, 626, 663, 667, 385, 219/386, 451; 348/77, 143
See application file for complete search history.

(56) References Cited

U.S. PATENT DOCUMENTS

| | | | |
|---|---|---|---|
| 4,431,892 A | 2/1984 | White | |
| 4,980,539 A * | 12/1990 | Walton | ............. 219/432 |
| 4,996,405 A | 2/1991 | Poumey et al. | |
| 5,445,066 A * | 8/1995 | Rosset | ........... A47J 37/0682 126/39 D |
| 5,872,351 A * | 2/1999 | Sowerby | ................. 219/621 |
| 6,384,387 B1 * | 5/2002 | Owens | ............ A47J 36/2483 219/387 |
| 6,523,458 B1 | 2/2003 | Turner | |
| 2004/0149736 A1 * | 8/2004 | Clothier | ................. 219/627 |
| 2004/0177771 A1 | 9/2004 | Small et al. | |
| 2007/0278207 A1 * | 12/2007 | Van Hoy | ............ A47J 47/14 219/387 |
| 2008/0047956 A1 * | 2/2008 | Dudman | ................ A47J 36/24 219/600 |
| 2008/0190912 A1 * | 8/2008 | Yeung et al. | ........... 219/443.1 |
| 2008/0197711 A1 * | 8/2008 | Kato | .................. H01F 38/14 307/104 |
| 2010/0012643 A1 * | 1/2010 | Li et al. | ................. 219/387 |
| 2010/0155387 A1 * | 6/2010 | Le Gall | ............... B29C 65/48 219/465.1 |

FOREIGN PATENT DOCUMENTS

| | | | | |
|---|---|---|---|---|
| JP | 4006790 | 1/1992 | | |
| JP | 2005149990 | 6/2005 | | |
| JP | 2005149990 A * | 6/2005 | | |
| WO | WO 2007015024 A2 * | 2/2007 | ............ | B29C 65/48 |
| WO | 2009004542 | 1/2009 | | |

* cited by examiner

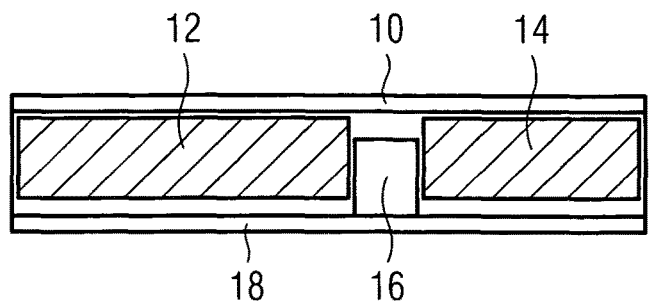
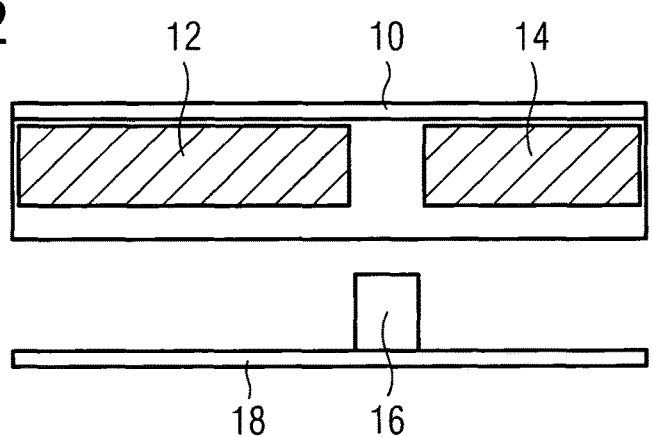
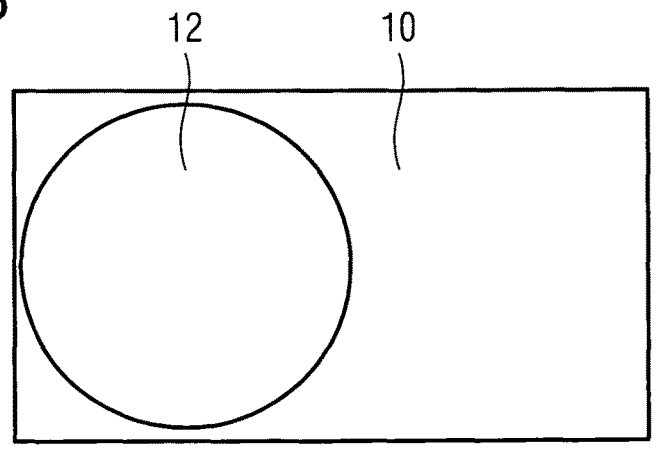

COOKING HOB

The present invention relates to a cooking hob. In particular, the present invention relates to a moveable cooking hob.

Cooking hobs consume a lot of electric energy. When the cooking hobs are activated in many households at the same time, then the regional grid may be overloaded. Often the electric power of the grids is not sufficient. Thus, in some countries the useable electric power for each household is limited to a certain level. For example, in Italy the electric power is limited to 3 kW for each household.

Other energy sources are not available all the time. An open fire for an outdoor food preparation is not possible and/or allowed all seasons. Generally, a food preparation with open fire is dangerous. Further, also the food preparation on table with open fire, like fondue or raclette, is dangerous.

Usually cooking appliances are permanently installed within a kitchen. There is also an energy supply connected to the cooking appliance. For example, the energy supply provides electric energy or gas. Thus, the cooking appliance cannot be removed from the kitchen, and the cooking procedure can only be performed within the kitchen. It is desirable, that some cooking procedures can be performed on the dinner table or in an outdoor area.

Known moveable electric cooking appliances are connected to a distant power supply. Other known moveable cooking appliances are gas powered. However, the gas powered cooking appliances cause a risk of explosion. Further, moveable cooking appliances with solar technology are known.

Battery powered cooking hobs face the difficulties relating to the size and the weight of the battery system. In order to obtain the required energy for cooking purposes, relative large and heavy batteries are necessary by using the current technologies. For example, storing energy of about 1 kWh requires a battery with a weight of 10 kg and a volume of 5 $dm^3$.

It is an object of the present invention to provide a cooking hob, which overcomes at least some of the above disadvantages.

The object of the present invention is achieved by the cooking hob described herein.

According to the present invention the cooking hob includes a mobile upper part and a stationary or mobile lower part, wherein:
- the upper part includes at least one panel arranged at its top side,
- the upper part includes at least one induction coil arranged below the panel,
- the upper part includes at least one rechargeable battery,
- the upper part includes at least one inverter circuit for generating the alternating current for the induction coil,
- the lower part includes a base plate,
- the lower part includes a power supply circuit arranged on the base plate and connected or connectable to the grid, and
- the upper part is attachable on and removable from the lower part by a user.

The main idea of the present invention is the combination of the power supply for the induction coil by an integrated battery on the one hand and the mobile and stationary part of the cooking hob on the other hand. Said stationary part forms a docking station. The mobile part of the cooking hob is the proper cooking hob. Normally, the proper cooking hob is located in the docking station on the worktop of the kitchen such as a conventional cooking hob. However, the mobile part of the cooking hob can also be used on the dining table or outdoor. The mobile part of the cooking hob is functional without connection to the grid. The induction technology allows that only the pot on the cooking hob is heated, so that the risk of fire is minimized.

According to a preferred embodiment of the present invention the cooking hob is a moveable cooking hob.

In particular, the inverter circuit may be provided for transmitting a direct current from the battery and/or from the power supply circuit into an alternating current for the corresponding induction coil. The induction coil requires an alternating current with a relative high frequency, for example about 30 kHz.

According to a preferred embodiment of the present invention the at least one induction coil is supplied with a medium voltage, if the inverter circuit is connected to the battery, and the at least one induction coil is supplied with a high voltage, if the inverter circuit is connected to the power supply circuit. For example, said high voltage is about 230 V.

The inverter circuit may be an integrated part of the corresponding induction coil. Alternatively, the inverter circuit may be a separate part.

For example, the at least one battery is arranged besides the corresponding induction coil and below the panel. In this case, the power supply circuit may be arranged besides the induction coil and/or the battery.

Alternatively, at least one battery is arranged below the corresponding induction coil. In this case, the power supply circuit may be arranged besides the at least one battery.

For example, the battery includes at least one lithium-ion-accumulator. Alternatively, the battery bases on metal hydride technology.

Preferably, the battery has a capacity between 0.5 kWh and 2 kWh.

According to a special embodiment of the present invention the cooking hob includes at least one further inverter circuit for transmitting the direct current from the battery into an alternating current for the grid. Thereby the further inverter circuit may be arranged on the lower part of the cooking hob. The battery can feed the grid, when the grid fails or the power of the grid is reduced or limited.

Further, the cooking hob may include at least one power output for supplying external electric and/or electronic devices. This is particularly advantageous, if the cooking hob is used as an outdoor cooking hob.

Moreover, the cooking hob may comprise and/or correspond with further electric components, like a light system and/or a cooling system.

As protective action, at least one heat insulating layer may be arranged between the panel and the at least one battery in order to avoid overheating of said at least one battery.

At last the panel may be a glass ceramic panel.

Novel and inventive features of the present invention are set forth in the appended claims.

Figure 5:
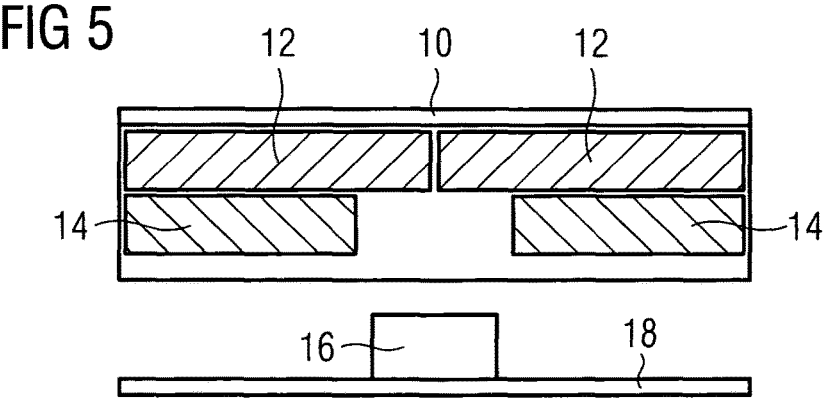
Figure 6:
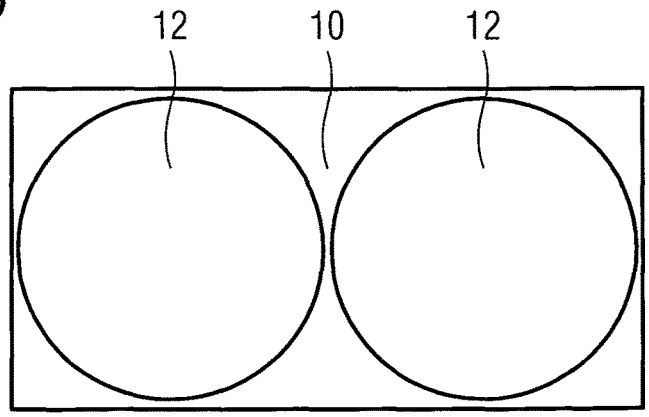

The present invention will be described in further detail with reference to the accompanied drawings, in which FIG. 1 illustrates a sectional front view of a cooking hob according to a first embodiment of the present invention, FIG. 2 illustrates a sectional front view of the cooking hob according to the first embodiment of the present invention in an uncoupled state, FIG. 3 illustrates a top view of the cooking hob according to to the first embodiment of the present invention, FIG. 4 illustrates a sectional front view of the cooking hob according to a second embodiment of the present invention, FIG. 5 illustrates a sectional front view of the cooking hob according to the second embodiment of the present invention in an uncoupled state, and FIG. 6 illustrates a top view of the cooking hob according to the second embodiment of the present invention.

FIG. 1 illustrates a sectional front view of a cooking hob according to a first embodiment of the present invention.

The cooking hob includes a glass ceramic panel 10 at the top side and a base plate 18 at the bottom side. An induction coil 12, a battery 14 and a power supply unit 16 are arranged side-by side between the glass ceramic panel 10 and the base plate 18. The power supply unit 16 is arranged between the induction coil 12 and the battery 14. The battery is rechargeable. In particular, the battery 14 is a lithium-ion-accumulator. Preferably, the battery 14 has a capacity between 0.5 kWh and 2 kWh.

Further, the battery 14 may use metal hydride technology.

The induction coil 12 and the battery 14 are attached at the lower side of the glass ceramic panel 10. The power supply unit 16 is attached on the top side of the base plate 18. The glass ceramic panel 10, the induction coil 12 and the battery 14 form an upper part of the cooking hob. The power supply unit 16 and the base plate 18 form a lower part of the cooking hob. The upper part of the cooking hob can be attached at and removed from the lower part of the cooking hob.

There is a distance between the battery 14 and the glass ceramic panel 10 in order to avoid overheating of the battery 14. Alternatively or additionally, a heat insulating layer may be arranged between the battery 14 and the glass ceramic panel 10 in order to avoid overheating of the battery 14.

Further, the upper part includes an inverter circuit, which is not explicitly shown in FIG. 1. The inverter circuit is provided to transform the direct current from the battery 14 to an alternating current for the induction coil 12. The induction coil 12 requires an alternating current with a high frequency, e.g. about 30 kHz. In this example, the inverter circuit is an integrated part of the induction coil 12. Alternatively, the inverter circuit may be arranged between the induction coil 12 and the battery 14.

FIG. 2 illustrates a sectional front view of the cooking hob according to the first embodiment of the present invention in an uncoupled state. In FIG. 2 the upper part and the lower part of the cooking hob are separated.

The upper part of the cooking hob, i.e. the glass ceramic panel 10, the battery 14 and the induction coil 12 with the inverter circuit form the proper cooking hob. The lower part of the cooking hob, i.e. the power supply unit 16 and the base plate 18, form a docking station for the proper cooking hob.

Since the battery 14 is rechargeable, the proper cooking hob is independently functional in a battery operation mode. Further, the proper cooking hob is mobile in the battery operation mode. When the proper cooking hob is coupled to the docking station as shown in FIG. 1, then the cooking hob is functional in a mains operation mode as well as in the battery operation mode.

The recharging of the battery 14 is performed by a direct connection of the cooking hob to the grid.

FIG. 3 illustrates a top view of the cooking hob according to the first embodiment of the present invention. FIG. 3 clarifies the position and the size of the induction coil 12 in relationship to the top side of the glass ceramic panel 10. In this example, the cooking hob has a width of about 60 cm and a depth of about 30 cm.

The cooking hob according to the first embodiment is relative flat, since the induction coil 12 with the inverter circuit, the battery 14 and the power supply unit 16 are arranged at the same level. The induction coil 12 and the battery 14 are attached directly below the glass ceramic panel 10. In this example, the power supply unit 16 is arranged between the induction coil 12 and the battery 14, when the upper part is attached upon the lower part.

FIG. 4 illustrates a sectional front view of the cooking hob according to a second embodiment of the present invention.

The cooking hob of the second embodiment includes also the glass ceramic panel 10 at the top side and the base plate 18 at the bottom side. Two induction coils 12 are arranged side-by side below the glass ceramic panel 10. Two batteries 14 are arranged below the induction coils 12, wherein each induction coil 12 corresponds with one of the batteries 14. Each battery 14 is attached at the lower side of the corresponding induction coil 12.

There is also a distance between the batteries 14 and the glass ceramic panel 10 in order to avoid overheating of the battery 14. Alternatively or additionally, a heat insulating layer may be arranged between the batteries 14 and the glass ceramic panel 10 or between the batteries 14 and the corresponding induction coils 12 in order to avoid overheating of the batteries 14.

For each induction coil 12 one inverter circuit is provided. In this example, the inverter circuits are integrated components of the corresponding induction coils 12. The power supply unit 16 is attached at the base plate 18 and arranged between the induction coils 12.

FIG. 5 illustrates a sectional front view of the cooking hob according to the second embodiment of the present invention in an uncoupled state. In FIG. 5 the upper part and the lower part of the cooking hob are separated.

The upper part of the cooking hob, i.e. the glass ceramic panel 10, the both batteries 14 and the both induction coils 12 with the integrated inverter circuits form the proper cooking hob. The lower part of the cooking hob, i.e. power supply unit 16 and the base plate 18, form the docking station for the proper cooking hob.

FIG. 6 illustrates a top view of the cooking hob according to the second embodiment of the present invention. FIG. 6 clarifies the positions and the sizes of the both induction coils 12 in relationship to the top side of the glass ceramic panel 10. In this example, the cooking hob has also the width of about 60 cm and the depth of about 30 cm.

The cooking hob according to the second embodiment is relative high, since the induction coils 12 with the inverter circuits are arranged above the batteries 14 and the power supply unit 16.

The inventive cooking hob is functional without power cable. Thus, there is no risk of stumbling on any cable.

The inventive cooking hob allows an independent food preparation in regions with unstable grids. The battery of the inventive cooking hob can equalise a peak flattening in the grid.

An economic advantage of the inventive cooking hob is that the battery can be loaded at those times, when the electric energy is cheap.

With the inventive cooking hob there is no risk of fire during an outdoor use. But the inventive cooking hob allows the same degree of freedom as a gas or wood fired barbecues.

The inventive cooking hob allows a loading of the battery 14, when electric energy is available, e.g. as solar energy or from regenerative supplied isolated networks.

A further option of the present invention is the use of the electric energy in the battery 14 for feeding the grid, when the grid fails or the power of the grid is reduced or limited.

In this case, a further inverter circuit may be arranged in the docking station, i.e. in the lower part of the cooking hob. Said further inverter circuit transforms the direct current front battery 14 into an alternating current of a low frequency, e.g. about 50 Hz.

The inventive cooking hob may comprise a control circuit, which limits the energy and/or power for the induction coil 12, when the cooking hob is supplied only by the battery 14. Such a control circuit increases the independence of the cooking hob.

The charging procedure of the rechargeable battery 14 is preferably performed at a time, when the energy demand to the grid is relative low, so that also the energy costs are low. In many countries the energy costs are lower, if the charging procedure of the battery 14 is performed overnight.

The cooking hob may have at least one power output for supplying external electric and/or electronic devices. This is particularly advantageous for an outdoor use.

The cooking hob may comprise further electric components, like a light system and/or a cooling system. Alternatively, the cooking hob may correspond with further said electric components, like the light system and/or the cooling system.

The inventive cooking hob is movable by wheels or by other equipment. The inventive cooking hob is suitable for indoor as well as for outdoor use.

The inventive cooking hob may include a cooking table, wherein said cooking table encloses the cooking hob or is arranged besides the cooking hob. The cooking table provides a working area for food preparation. The cooking table may also include a shelf or shelves for dish and glass storage. Further, the cooking table may also comprise drawers and metal bars for cooking utensils. Moreover, the cooking table may include handles for an easy moving of the cooking table. The cooking table provides a proper placement in relation to the cooking hob.

Although illustrative embodiments of the present invention have been described herein with reference to the accompanying drawings, it is to be understood that the present invention is not limited to that precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 glass ceramic panel
12 induction coil
14 battery
16 power supply circuit
18 base plate

The invention claimed is:

1. A cooking hob with a mobile upper part and a stationary or mobile lower part, wherein:
   the upper part includes at least one panel (10) arranged at its top side,
   the upper part includes at least one induction coil (12) arranged below the panel (10),
   the upper part includes at least one rechargeable battery (14),
   the upper part includes at least one inverter circuit for generating alternating current for the induction coil (12),
   the lower part includes a base plate (18),
   the lower part includes a power supply circuit (16) arranged on the base plate (18) and connected or connectable to a power grid, and
   the upper part is attachable on and removable from the lower part by a user.

2. The cooking hob according to claim 1, characterized in, that the cooking hob is a moveable cooking hob.

3. The cooking hob according to claim 1, characterized in, that the inverter circuit is provided for transmitting a direct current from the battery (14) and/or from the power supply circuit (16) into the alternating current for the corresponding induction coil (12).

4. The cooking hob according to claim 3, characterized in, that the at least one induction coil (12) is supplied with a medium voltage, if the inverter circuit is connected to the battery (14), and the at least one induction coil (12) is supplied with a high voltage, if the inverter circuit is connected to the power supply circuit (16).

5. The cooking hob according to claim 1, characterized in, that the inverter circuit is an integrated part of a corresponding induction coil (12) of the at least one induction coil (12).

6. The cooking hob according to claim 1, characterized in, that the at least one battery (14) is arranged besides a corresponding induction coil (12) of the at least one induction coil (12) and below the panel (10).

7. The cooking hob according to claim 6, characterized in, that the power supply circuit (16) is arranged besides the induction coil (12) and/or the battery (14).

8. The cooking hob according to claim 1, characterized in, that at least one battery (14) is arranged below a corresponding induction coil (12) of the at least one induction coil (12).

9. The cooking hob according to claim 8, characterized in, that the power supply circuit (16) is arranged besides the at least one battery (14).

10. The cooking hob according to claim 1, characterized in, that the battery (14) includes at least one lithium-ion-accumulator and/or the battery (14) bases on metal hydride technology.

11. The cooking hob according to claim 1, characterized in, that the battery (14) has a capacity between 0.5 kWh and 2.0 kWh.

12. The cooking hob according to claim 1, characterized in, that the cooking hob includes at least a second inverter circuit for transmitting direct current from the battery (14) into the alternating current for the power grid.

13. The cooking hob according to claim 12, characterized in, that the further inverter circuit is arranged on the lower part of the cooking hob.

14. The cooking hob according to claim 1, characterized in, that the cooking hob includes at least one power output for supplying external electric and/or electronic devices.

15. The cooking hob according to claim 1, characterized in, that the cooking hob comprises and/or corresponds with further electric components, like a light system and/or a cooling system.

16. The cooking hob according to claim 1, characterized in, that at least one heat insulating layer is arranged between the panel (10) and the at least one battery (14) in order to avoid overheating of said at least one battery (14).

17. The cooking hob according to claim 1, characterized in, that the panel (10) is a glass ceramic panel.

18. The cooking hob according to claim 1, characterized in, that the panel (10) comprises a stainless steel panel.

19. The cooking hob according to claim 1, characterized in, that the at least one rechargeable battery powers the at least one induction coil.

* * * * *